United States Patent [19]
Schoen

[11] 3,894,075
[45] July 8, 1975

[54] PREPARATION OF HYDROXYL-TERMINATED POLYESTERS
[75] Inventor: Löwhardt A. A. Schoen, Geleen, Netherlands
[73] Assignee: Stamicarbon, N.V., Geleen, Netherlands
[22] Filed: Mar. 8, 1971
[21] Appl. No.: 122,217

[30] Foreign Application Priority Data
Mar. 7, 1970  Netherlands.................. 7003277

[52] U.S. Cl. ...... 260/484 A; 252/431 R; 252/431 L; 260/77.5 AN; 260/78.3 R; 260/429.3; 260/429.5; 260/448 AD; 260/468 K; 260/606.5 B
[51] Int. Cl............................................. C07c 69/66
[58] Field of Search................. 260/484 A, 484 R

[56] References Cited
FOREIGN PATENTS OR APPLICATIONS
654,511   6/1951   United Kingdom............... 260/484

Primary Examiner—Lorraine A. Weinberger
Assistant Examiner—Paul J. Killos
Attorney, Agent, or Firm—Cushman, Darby & Cushman

[57] ABSTRACT

A process for producing hydroxy-terminated polyester by polymerizing a lactone or a mixture of lactones in the presence of a catalyst having the general formula $MM'(-OROH)_4$ where M is an alkali metal, M' is aluminum or boron and R is alkylene, isoalkylene, cycloalkylene or aralkylene. Polyesters having the general formula $$HO-R-O-(\overset{O}{\underset{\|}{C}}-R'-O-)_n-\overset{O}{\underset{\|}{C}}-R''-OH$$

are produced where R is a bifunctional hydrocarbon group, R' and R'' are alkylene groups and $n$ is a whole number equal to or larger than 3.

6 Claims, No Drawings

PREPARATION OF HYDROXYL-TERMINATED POLYESTERS

The invention relates to an improved process for polymerization of lactones to hydroxyl-terminated polyesters in the presence of new novel catalysts. The invention relates as well as to a process for preparation of the novel catalysts.

Processes are known for polymerizing lactones polyesters by heating them in the presence of a catalyst. The polyesters produced by these processes normally contain one hydroxyl end group and one carboxyl end group. Polyesters containing two hydroxyl end groups, hereinafter to be referred to as hydroxyl-terminated polyesters, have been sought as they are highly suited for preparing urethane polymers, whereas the single hydroxy containing polyesters are not suitable for such use.

It has been proposed to prepare hydroxyl-terminated polyesters by polymerizing a lactone, or a mixture of lactones, in the presence of a catalyst and a polyfunctional initiator containing at least two hydroxyl groups or amino groups, or at least one hydroxyl group and one amino group, such as ethylene glycol, ethylene diamine or ethanolamine. Widely different compounds may be used as catalysts for this purpose, such as i.a. sulphuric acid or boron trifluoride (see U.S. Pat. No. 2,914,556) and titanium chelates, for example isopropoxytitaniumstearate (see U.S. Pat. No. 2,878,236). However, according to this method of preparation, both a polyfunctional initiator and a catalyst must be added to the polymerization mixture, and polymerization times are normally 1 hour or longer at a polymerization temperature of 170°C.

An improved process has now been discovered wherein the polymerization of lactones to hydroxyl-terminated polyesters is considerably accelerated and simplified. The process steps thereof are less complex and complicated in comparison to the steps of the prior art processes. The improved process of the present invention comprises heating a lactone, or mixture of lactones, in the presence of a bimetallic alkoxide derived from a bifunctional alcohol. One of the metals in the alkoxide is an alkali metal and the other a metal is selected from the group consisting of boron aluminium, titanium and zirconium.

By using the bimetallic alkoxides of bifunctional alcohols as catalysts according to the process of the present invention, colourless or white polyesters with two hydroxyl end groups are prepared in a very short time without the need of addition of an initiator. The molecular weights of the polyesters formed depend on the ratio between the catalyst and the lactone or lactone mixture, as well as on other reaction conditions. The bimetallic catalyst compounds of the present invention having boron, or aluminium as the central atom, are particularly advantageous as they are composed of inexpensive metals and can be prepared by single, inexpensive procedures.

Bimetallic alkoxides derived from monofunctional alcohols have been disclosed in the prior art as catalysts for re-esterification reactions. These known compounds, such as $NaSb[OC_2H_5]_4$ and $LiAl[iso-OC_3H_7]_4$ are prepared by reacting a bimetallic hydride with a monofunctional alcohol (see for example, U.S. Pat. No. 2,720,506). The bimetallic alkoxides of monofunctional alcohols can also be prepared by allowing the two metals to react simultaneously with the monofunctional alcohol, by adding the alkoxides of the two metals together in an alcoholic solution, or by dissolving one metal in an alcoholic solution of the alkoxide of the other material (see Meerwein and co-workers, Liebigs Annalen der Chemie Vol. 455, page 227 (1927) and Vol. 476, page 113 (1929)).

According to the present invention, new aluminum or boron compounds with the formula $MM'[OROH]_4'$ where M is an alkali metal, M' is aluminium or boron, and R is a bifunctional hydrocarbon group of up to 10 carbon atoms, and the hydroxyl group in one alkoxide molecule may be bound to the bifunctional hydrocarbon group in either of the two possible positions, are prepared by reacting the corresponding bimetallic hydride $MM'H_4$ with a bifunctional alcohol having the formula HO—R—OH. This may be done, for example, by slowly adding a solution or suspension of the hydride in an inert organic solvent, such as tetrahydrofuran or diethylether, to the bifunctional alcohol or to a mixture of the bifunctional alcohol and an inert organic solvent.

Preferred bimetallic hydrides with the general formula $MM'H_4$ are $LiAlH_4$ and $NaBH_4$, as these compounds are commercially available in large quantities. According to the invention, other hydrides can also be converted to the corresponding bimetallic alkoxides. Suitable bifunctional alcohols are compounds that contain two hydroxyl groups and are free of constituents they may interfere with the reaction. Such compounds have the general formula HO—R—OH, where R denotes an alkylene, isoalkylene, cycloalkylene, aralkylene group, or a bifunctional ether group. Examples of these alcohols are ethylene glycol, propanediol 1.3, tetramethyleneglycol, hexamethyleneglycol, propyleneglycol, butanediol 1.3, 2.2. dimethylpropanediol 1.3, 3. methylbutanediol 1.4, 3.5. dimethylheptanediol 2.5, cyclohexanediol 1.4, 3.hydroxymethylcyclohexanol, 1.4. bis-hydroxymethylbenzene, 4. hydroxymethylphenol, diethyleneglycol, triethyleneglycol and dipropyleneglycol.

The bimetallic hydrides and the resulting bimetallic alkoxides are sensitive to water and acids and, therefore, the reaction between the bimetallic hydride and the bifunctional alcohol is performed in the absence of water and in an inert atmosphere, for example under nitrogen. In most cases, the bimetallic alkoxide formed in the reaction precipitates and is separated from the reaction mixture by filtration. After being washed and dried, the alkoxide formed can be stored in an inert dry atmosphere. If the alkoxide does not precipitate during the reaction, it can if desired be recovered, for example, by evaporation of the reaction mixture; however, this is not necessary as the solution of the alkoxide in its original state, can be added in a subsequent polymerization.

The novel bimetallic alkoxides of this invention, having the general formula $MM'[-OROH]_4$, are generally stable crystalline compounds even at elevated temperatures if kept away from water and acids. The bimetallic alkoxides derived from ethyleneglycol being somewhat of an exception are stable at 100°C, under high vacuum but split off one ethyleneglycol molecule per molecule, at 150°C, and another ethylene glycol molecule at 225°–250°C with formation of compounds having the general formula $MM'(-OC_2H_4O-)_1(-OC_2H_4OH)_2$ and $MM'(-OC_2H_4O-)_2$, respectively. The $-OC_2H_4O-$group forms a five-membered ring with the aluminium or boron. The formation of these energetically favorable five-membered rings probably constitutes the driving force for the reaction. The bimetallic alkoxides having the general formula MM'[—ORO—]$_x$ [—OROH]$_{4-2x}$, where $x=1$ or 2, are also employed as catalysts according to the present invention. The bimetallic alkoxides derived from bifunctional alcohols in which the hydroxyl groups are more remote from each other than in ethylene glycol do not exhibit this split-off or ring-forming reaction either at all or do so to a very limited extent only.

In the catalytic polymerization of lactones to hydroxyl-terminated polyesters according to this invention, the catalysts may be employed in quantities of between 0.01 and 10 mole % based on the amount of lactone, or mixture of lactones used. A low catalyst to lactone ratio yields a polyester of high molecular weight, whereas higher ratios produce polyesters of lower molecular weight. Polyesters can thus be prepared with molecular weights of anywhere between 300 to 10,000 and over. Hydroxyl-terminated polyesters with molecular weights of between 300 and 4,000 are the most suitable for further processing to elastomeric polyurethanes. Polyesters with molecular weights between 300 and 4,000 are prepared by the process of this invention using from 1–10 mole % of catalyst.

Preferred alkali-aluminium alkoxides according to this invention are LiAl [—OC$_2$H$_4$OH]$_4$, LiAl [—O—(CH$_2$)$_4$—OH]$_4$, NaAl [O[CH$_2$]$_6$OH]$_4$ and LiAl [—OCH$_2$CH$_2$CH(CH$_3$)OH]$_x$ [—OCH(CH$_3$)CH$_2$CH$_2$OH]$_{4-x}$, where x is a whole number from 0 to 4 inclusive. These preferred alkali aluminium alkoxides possess good catalytic activity and are easy to prepare.

Substituted as well as nonsubstituted lactones with 3 or 5–12 carbon atoms in the ring can be polymerized according to the present invention. Some examples are β-propiolactone, pivalolactone, α-methyl-β-propiolactone, δ-valerolactone, methyl-δ-valerolactone, dimethyl-δ-valerolactone, ethyl-δ-valerolactone, methoxy-δ-valerolactone, ethoxy-δ-valerolactone, ε-caprolactone, δ-methyl-ε-caprolactone, dimethyl-ε-caprolactone, cyclohexyl-ε-caprolactone, methoxy-ε-caprolactone, oenantholactone, methyloeantholactone, laurinolactone etc. Preference is given to the inexpensive caprolactone, either in monomer or comonomer form. Polyesters comprising substituted lactones in comonomer form have the advantage that they can be processed to elastomeric polyurethanes of low crystallinity.

The polymerization reactions is carried out between 50° and 250°C, and preferably between 125° and 200°C. At temperatures lower than 50°C the reaction takes a rather long time, while at temperatures higher than 250°C give rise to side reactions and degradation. Water and acids interfere with the polymerization, while the presence of oxygen may lead to formation of coloured products. It is preferred, therefore, to work with dry starting materials in a dry, inert atmosphere, for example in a nitrogen atmosphere. Normally, the reaction is carried out at atmospheric pressure, subatmospheric or superatmospheric pressures can also be used.

Upon termination of the polymerization reaction, the catalyst residues, i.e., the metal atoms, may be separated from the reaction mixture to prevent them from interfering with the further processing of the polymer to polyurethanes. A particular advantage of the process of this invention is that the catalyst residues are easily removed, for example by treating the reaction mixture with a dilute mineral acid and removing the metal salts formed by washing with water. This permits further processing of the polyester to transparent polyurethane elastomers.

The polymerization reaction of the present process can be carried out with the bulk reaction materials being the sole reaction medium or the reaction can take place in an inert diluting agent. If there is no diluting agent the catalyst is added as a solution or suspension to the liquid lactone or mixture of lactones, whereupon the temperature is increased. If the reaction is performed in an inert solvent or diluting agent, the diluting agent can be an aliphatic or aromatic hydrocarbon, a substituted hydrocarbon or an ether and the catalyst is added to the reaction medium as a solution or suspension of the same diluting agent.

If a bimetallic alkoxide having the general formula MM'[OROH]$_4$ is used as the catalyst, a new type of hydroxyl-terminated polyester is obtained having the general formula HO—R—O [—CO—R'—O]$_n$—CO—R'—OH, where R denotes the bifunctional hydrocarbon group derived from the alkoxide, R' the substituted or non-substituted alkylene group derived from the lactone monomer, and n is a whole number equal to or larger than 3. If the polyester has been obtained by copolymerization of two or more lactones, R' represents the various possible alkylene groups. As appears from the general formula, one hydroxyl end group comes from the alkoxide present in the catalyst, while the other hydroxyl end group originates from the terminal lactone residue. It appears that the polymerization is initiated by the alkoxide function, and that the hydroxyl group of the monoalkoxide in the bifunctional alcohol does not play a part.

If a bimetallic alkoxide with the general formula MM'[—ORO—]$_1$ [—OROH]$_2$ is used as the catalyst, a polyester is obtained in which the molecules are partly of the above mentioned, new type, partly of the conventional known type, with the —ORO group being included in the chain and the two hydroxyl end groups originating from the terminal lactone residues. In this case the ratio between the molecules of the new type and those of the known type is 2:1.

Hydroxyl-terminated polyesters are characterized by the hydroxyl number which is expressed in mg of KOH per g of polyester and determined by means of an end group titration. Another characterization of the polyester is the acid number, likewise expressed in mg of KOH per g of polyester. The polyesters prepared according to the invention almost invariably have a hydroxyl number higher than 30 and an acid number lower than 5. The hydroxylterminated polyesters can be used as molding materials, or as plasticizers in other polymers. The hydroxyl-terminated polyesters are particularly suited for further processing to polyurethanes. To this end, the polyester is first converted with a diisocyanate into a urethane-prepolymer, which is then converted into a polyurethane by means of a bifunctional alcohol or amine. In this way it is possible to prepare polyurethane polymers suitable as fibers, films and foams.

The invention will be further described with reference to the following examples relating to the preparation of new catalysts, the polymerization of lactones by means of said catalysts, and the further processing of the hydroxyl-terminated polyesters.

EXAMPLE 1

Preparation of LiAl[OCH$_2$CH$_2$OH]$_4$

To a mixture of 10.0 g of ethylene glycol (0.161 moles) and 20 ml of absolute diethylether contained in a reaction vessel, provided with a reflux cooler and a stirrer, were added slowly 100 ml of a 0.36 molar solution of LiAlH$_4$ in water-free tetrahydrofuran with vigorous stirring under a stream of dry nitrogen gas. The reaction proceeded with violent evolution of hydrogen gas. The temperature of the reaction mixture was kept below 40°C by controlling the feed rate of the LiAlH$_4$ solution. The reaction mixture, in which a white precipitate had formed, was stirred for a half hour after all LiAlH$_4$ has been added. The precipitate was removed from the reaction mixture by filtration in a nitrogen atmosphere. The precipitate was then washed with dry tetrahydrofuran and dried in vacuo. This yielded 7.27 g of bright white, dry and pulverulent LiAl[OCH$_2$CH$_2$OH]$_4$. The correctness of the formula of the compound obtained was verified by comparison of results of the elementary analysis of the compound obtained as compared to the compound of the proposed formula.

Theoretical analysis of LiAl (OCH$_2$CH$_2$OH)$_4$: C 34.43%; H 7.23%; Li 2.48%; Al 9.70%.

Analysis of compound formed: C 34.4%; H 7.5%; Li 2.3%; Al 9.1%

IR spectrum also confirmed the correctness of the above formula as that of the compound obtained.

EXAMPLE 2

Preparation of LiAl [—O(CH$_2$)$_4$OH]$_4$.

Following the procedure of Example 1, 100 ml of a 0.75 molar solution of LiAlH$_4$ in dry tetrahydrofuran were allowed to react with 30.3 g (0.33 mole) of butadiole-1.4. This yielded 22.47 g of bright white, dry LiAl [O(CH$_2$)$_4$OH]$_4$.

Theoretical analysis of LiAl [O(CH$_2$)$_4$OH]$_4$: C 49.23%; H 9.30%; Li 1.78%; Al 6.92

Analysis of compound formed: C 49.1%; H 9.2%; Li 1.4%; Al 7.2%.

EXAMPLE 3

Preparation of NaAl [—O(CH$_2$)$_6$OH]$_4$

NaAlH$_4$ and hexadiole-1.6 were allowed to react following the procedures as described in Example 1. This yielded bright white, dry, pulverulent NaAl [—O(CH$_2$)$_6$OH]$_4$.

EXAMPLE 4

LiAlH$_4$ and butadiole-1.3 were allowed to react in the way described in Example 1. This did not yield a precipitate, but a 0.196 molar solution of LiAl [—OCH$_2$CH$_2$CH(CH$_3$)OH]$_x$ [—OCH(CH$_3$)CH$_2$CH$_2$OH]$_{4-x}$, where $x$ = 0,1,2,3 and 4. This solution was stored as such, and afterwards used in the polymerization of lactones.

EXAMPLE 5

Preparation of NaB [—OCH$_2$CH$_2$OH]$_4$.

A suspension of NaBH$_4$ in dry tetrahydrofuran was added very slowly and with thorough stirring to a mixture of ethyleneglycol and tetrahydrofuran. The reaction proceeded much more gently than that with the alkali-aluminium hydrides of Example 1. After all the NaBH$_4$ had been added, the reaction mixture was heated for another 1 ½ hours. A precipitate was formed and filtered off, washed and dried as in Example 1. This yielded white and dry NaB [—OCH$_2$CH$_2$OH]$_4$.

EXAMPLE 6

In a glass reaction vessel 23.40 g of water-free ε-caprolactone (0.205 mole) were heated to 170°C in a nitrogen atmosphere at atmospheric pressure. Then, 0.695 g of LiAl [—OCH$_2$CH$_2$OH]$_4$ (lithium aluminium tetra-ethyleneglycolate) were added, the said amount being equivalent to 1.22 mole % calculated to the amount of ε-caprolactone. The polymerization reaction started rapidly and samples measuring the refractive index at 60°C were periodically taken while the reaction was in progress and the refractive index measured at 60°C. The polymerization is completed when the refractive index does not show any further variation with time. In the present case the reaction mixture became viscous after 1 minute, and the polymerization was completed after 3 minutes. The bright white reaction product was dissolved in benzene, and this solution was treated with concentrated sulfuric acid until it had a PH of between 5 and 6. After the precipitated metal salts had been filtered off, the clear filtrate was evaporated in vacuo vacuum with all the volatile components being removed by the vacuum treatment at 120°–130°C and 0.5 mm Hg. This yielded 23.5 g of white, waxy polymer. The yield was 97% based on the ε-caprolactone. The average molecular weight of the polymer obtained was 2778, the hydroxyl number 39.27, and the acid number 0.56.

EXAMPLE 7

In a glass reaction vessel 0.835 g of lithium aluminium tetraethylene glycolate (0.003 mole) were suspended in 22.80 g of water-free ε-caprolactone (0.20 mole). The suspension was heated to 150°C with simultaneous stirring and dept at this temperature for 8 minutes when the polymerization was completed. The bright white polymerizate was dissolved in 100 ml of acetone, and the resulting solution poured into 100 ml of water with simultaneous stirring, during which operation the polyester precipitated. The precipitate was filtered off, washed with water and dried at 120°–130°C and 0.5 mm Hg. The yield was 21.4 g of white, waxy polyester with a hydroxyl number of 44.8, an acid number of 0.56 and a molecular weight of 2439.

EXAMPLES 8 AND 9

Using the procedure described in Example 7, ε-caprolactone was polymerized with 1.5 mole % of sodium-borium tetraethylene glycolate, which yielded light-yellow waxy polyesters. The reaction conditions and the properties of the polyesters are compiled in Table I.

TABLE I

| example | reaction temp. | reaction time | hydroxyl number | acid number | molecular weight |
|---------|----------------|---------------|-----------------|-------------|------------------|
| 8 | 150°C | <1 min. | 28.1 | 1.12 | 3698 |
| 9 | 110°C | 7 min. | 22.4 | 0.65 | 4770 |

EXAMPLES 10 TO 28

Table II shows the reaction conditions and results for 19 experiments, all of which relate to the polymerization, or copolymerization, of ε-caprolactone, ε-methyl-ε-caprolactone (Examples 11 to 16), γ-methyl-ε-caprolactone (Example 17) and δ-methyl-δ-valerolactone (Example 18) were used as comonomers.

TABLE III

| test | starting polyester $\overline{M}$ | film thickness mm | tensile strength kg/cm$^2$ | elongation % |
| --- | --- | --- | --- | --- |
| 29 | 2778 | 0.16 | 333 | 620 |
| 30 | 1370 | 0.16 | 310 | 470 |

| example no. | ε-caprolactone mole % | comonomer mole % | catalyst | catalyst mole % | temp. °C | time min | hydroxyl number | acid number | $\overline{M}$ | product |
| --- | --- | --- | --- | --- | --- | --- | --- | --- | --- | --- |
| 10 | 100 | — | I | 0.04 | 170 | 12 | — | — | 70.000 | white, very tough |
| 11 | 80 | 20 ε—CH$_3$-ε—caprolactone | I | 1.20 | 170 | 11 | 39.3 | 0.56 | 2778 | white wax |
| 12 | 80 | '' | II | 1.50 | 170 | 6 | 44.8 | 0.56 | 2439 | light-yellow wax |
| 13 | 80 | '' | II | 1.50 | 135 | 26 | 44.8 | 0.56 | 2439 | white, thin wax |
| 14 | 80 | '' | II | 1.50 | 135 | 26 | 44.8 | 0.56 | 2439 | white, thin wax |
| 15 | 80 | '' | II | 1.50 | 100 | 180 | 44.8 | 0.36 | 2439 | light-yellow, thin wax |
| 16 | 80 | '' | II | 2.34 | 150 | 12 | 50.5 | 1.68 | 2008 | white, thin wax |
| 17 | 80 | 20 γ-CH$_3$—ε caprolactone | II | 2.34 | 150 | 15 | 44.9 | 0.56 | 2440 | white wax |
| 18 | 75 | 25 δ—CH$_3$—δ valerolactone | II | 2.34 | 150 | 8 | 89.8 | 18.51 | 877 | white wax |
| 19 | 100 | — | III | 0.50 | 150 | 4 | 16.8 | 1.68 | 5556 | white, hard wax |
| 20 | 100 | — | IV | 1.47 | 120 | 30 | 44.8 | 0.56 | 2439 | white wax |
| 21 | 100 | — | IV | 1.47 | 70 | 90 | 44.8 | 0.56 | 2439 | white wax |
| 22 | 100 | — | II | 1.46 | 150 | 9 | 39.3 | 0.56 | 2778 | white wax |
| 23 | 100 | — | II | 2.19 | 150 | 7 | 50.5 | 1.12 | 2128 | white wax |
| 24 | 100 | — | II | 2.92 | 150 | 7 | 72.9 | 1.12 | 1493 | white wax |
| 25 | 100 | — | II | 4.38 | 150 | 6 | 112.2 | 4.49 | 926 | white wax |
| 26 | 100 | — | II | 5.84 | 150 | 5 | 129.0 | 3.93 | 820 | white wax |
| 27 | 100 | — | II | 6.57 | 150 | 4 | 145.9 | 3.37 | 735 | white, soft wax |
| 28 | 100 | — | II | 9.34 | 150 | 3 | 190.7 | 2.81 | 571 | white, soft wax |

I = LiAl (—OCH$_2$CH$_2$OH)$_4$
II = LiAl [—O(CH$_2$)$_4$OH]$_4$
III = NaAl [—O(CH$_2$)$_n$OH]$_4$
IV = LiAl[—OCH$_2$CH$_2$CHOHCH$_3$]x [—OCHCH$_3$CH$_2$CH$_2$OH] 4−x  X= 0 to 4

The products formed varied from a very tough, white polyester of high molecular weight to soft, waxy polyesters of fairly low molecular weights.

EXAMPLES 29 AND 30

These examples relate to the processing of hydroxyl-terminated polyesters prepared in conformity with the invention to polyurethanes with elastomeric properties.

Polyesters with molecular weights of 2778 and 1370 prepared by polymerization of ε-caprolactone by means of a LiAl [O—CH$_2$CH$_2$OH]$_4$ catalyst were first processed to urethane prepolymers. To this end, batches of 0.20 mole of polyester were dissolved in dimethyl formamide and reacted with 0.64 mole of diphenylmethane-4-4'-diisocyanate at 70°C. The temperature was then raised to 110°C, and the reaction mixture was stirred for 40 minutes.

Subsequently, 0.40 mole of 1.4 butadiole were added to said solution, and the reaction was continued for 60 minutes at 110°C. This yielded a clear and homogeneous solution of approximately 30 % by wt of polyurethane in dimethylformamide, from which transparent, high-gloss films were prepared. The tensile strength and elongation of said films were measured, the results being shown in Table III. After two months, the films still showed the same tensile strength, elongation and gloss.

What is claimed is:

1. In a process for producing a hydroxy-terminated polyester by the catalytic polymerization of at least one lactone at a temperature of about 50° to about 250°C, the improvement consisting of conducting the polymerization in the presence of a catalyst, the catalyst consisting essentially of a bimetallic alkoxide derived from a bifunctional alcohol of up to about 10 carbon atoms, one metal in said bimetallic oxide being an alkali metal, and the other metal in said bimetallic alkoxide being selected from the group consisting of boron, aluminum, titanium and zirconium.

2. A process according to claim 1, wherein the bimetallic alkoxide catalyst is present in an amount of from 0.01 to 10 mole % based on the lactone, or mixture of lactones.

3. A process according to claim 1, wherein the bimetallic alkoxide catalyst is present in an amount of from 1 to 10 mole % based on the lactone on mixture of lactones.

4. A process according to claim 1, wherein the bimetallic alkoxide has the formula MM'[—OROH]$_4$ where M is an alkali metal, M' is aluminium or boron and R is alkylene, iso-alkylene, cyclo-alkylene, or aralkylene.

5. A process according to claim 4, wherein M' is aluminium and R is an alkylene group with 2–6 carbon atoms.

6. A process according to claim 1, wherein ε-caprolactone, or a mixture of ε-caprolactone with one or several other lactones, is polymerized.

* * * * *